(12) United States Patent
Wafzig

(10) Patent No.: US 6,375,594 B1
(45) Date of Patent: Apr. 23, 2002

(54) CONTINUOUSLY VARIABLE TOROIDAL TRANSMISSION

(75) Inventor: Jürgen Wafzig, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/310,416

(22) Filed: May 12, 1999

(30) Foreign Application Priority Data

May 16, 1998 (DE) .......................................... 198 22 194

(51) Int. Cl.[7] ............................................... F16H 15/38
(52) U.S. Cl. .......................................... 476/40; 476/42
(58) Field of Search ............................. 476/40, 41, 42, 476/45, 46

(56) References Cited

U.S. PATENT DOCUMENTS

| 2,152,796 | A | * | 4/1939 | Erban | |
|---|---|---|---|---|---|
| 3,739,658 | A | * | 6/1973 | Scheiter | |
| 4,086,820 | A | | 5/1978 | Kraus et al. | |
| 4,453,427 | A | * | 6/1984 | Kraus et al. | 476/40 |
| 4,554,841 | A | * | 11/1985 | Okoshi | 476/40 |
| 4,893,517 | A | * | 1/1990 | Nakano | |
| 5,893,815 | A | * | 4/1999 | Nakano | 476/42 |
| 6,030,309 | A | * | 2/2000 | Nakano | 476/42 |

FOREIGN PATENT DOCUMENTS

DE 197 32 084.8 * 7/1997

OTHER PUBLICATIONS

Japanese Abstract No. 5–26317 A, M–1428 dated Jun. 11, 1993, vol. 17, No. 306.
Japanese Abstract No. 7–332451 A dated Dec. 22, 1995 to Mazada Motor Corp.
Japanese Abstract No. 6–34028 A, M–1605 dated May 16, 1994, vol. 18, No. 254.
Japanese Abstract No. 6–280955A dated Oct. 7, 1994 to Mazda Motor Corp.

* cited by examiner

Primary Examiner—David A. Bucci
Assistant Examiner—William C Joyce
(74) Attorney, Agent, or Firm—Davis & Bujold, P.L.

(57) ABSTRACT

The toroidal transmission has a input shaft (1) and at least one input disc (4, 6) and at least one output disc (5, 7) with wheels disposed therebetween. Supports (16, 17) for the wheels (18, 19) are mounted on ends of lower and upper cross yokes, the ends of the upper cross yokes (12, 13) being preferably gradually decreased in spacing to the lower cross yokes (27) and the diameters of upper recesses for lodging upper bearings being larger than those of associated lower recesses.

4 Claims, 2 Drawing Sheets

$d_2 = d_1$ $d_2 > d_1$

CONTINUOUSLY VARIABLE TOROIDAL TRANSMISSION

BACKGROUND OF THE INVENTION

This invention relates to a continuously variable toroidal transmission.

A continuously variable toroidal transmission (C.V.T. or variator) usually has input and output discs situated coaxially relative to a common shaft, arranged in pairs and having toroidal inner surfaces, and wheels placed between the toroidal forming pairs of input and output discs. The wheels are in frictional contact both with the input discs and the output discs and by frictional contact transmit torque transmitted to them by the input disc to the output disc, the speed of the toroidal wheels being higher the larger the space between their point of contact with the input disc and the axis of rotation. The speed of the output discs, on the other hand, is higher the closer the point of contact between toroidal wheel and output disc to the axis of rotation. Accordingly, by tilting the toroidal wheels, it is possible continuously variably to adjust at will the speed of the output disc. For this purpose, the axes of rotation of the toroidal wheels are placed on a support which can be controlled by a swiveling device.

The basic principle of such a continuously variable toroidal transmission has already been described in U.S. Pat. No. 2,152,796 which was published in the year 1939. In said publication, two pairs of concave input and output discs are provided between which tiltably supported toroidal wheels are situated so that a torque transmitted, via an input shaft to the input discs, and the toroidal wheels, in accordance with the relative position of the toroidal wheels with a reduction ratio depending thereon, is fed in the form of a planetary gear to a summarizing transmission, via the output discs, a gear stage and a hollow shaft. The carrier of the planetary gear drives an output shaft, which is connected with the driving wheels, for example, of a motor vehicle. The output shaft is situated parallel to and spaced from the input shaft. The output gearwheel and both output discs are rotatably placed on a sleeve, which on its ends, is supported in bearing brackets. The arrangement of the bearing brackets, between each input and output discs, presupposes a sufficient large installation space between said discs.

The transmission, according to U.S. Pat. No. 3,739,658, likewise has a two-way variator with two input and output discs disposed in pair between, which tiltably mounted toroidal wheels, are situated. In this construction, a bearing bracket is horizontally disposed between the two output discs, which is part of the housing. The power from the output discs is supplied to a hollow shaft, via a planetary gear, which additionally acts as differential. The hollow shaft is non-rotatably connected with the output gear wheel and is rotatably retained by ball bearings in the bearing bracket.

The output gear wheel is in operative connection with a gear wheel which is non-rotatably fastened on the housing of a torque converter. The latter drives the output shaft of the transmission. The arrangement of the torque converter on the input of the output shaft requires a relatively large center distance between input and output shafts of the transmission. The applications for said transmission are thus very limited, since the required installation space is often not available.

U.S. Pat. No. 4,893,517 has disclosed a continuously variable toroidal transmission having one input shaft which penetrates a housing. The housing is divided by a partition wall in two hollow spaces in which are respectively supported one input disc and opposite to it one output disc with toroidal wheels therebetween, wherein the input disc and the output discs lie one in the hollow spaces on a common axis relative to which the wheels can be swivelled to obtain the desired speed ratio. The pairs of input discs and output discs are located in the hollow spaces with mirror symmetry, relative to each other, in a manner such that both output discs lie adjacent each other on opposite sides of the partition wall that separates the two hollow spaces from each other and in which a gear wheel is mounted which is driven by the two output discs.

The Applicants unpublished patent application DE 197 32 084.8 describes a continuously variable toroidal transmission in which the input shaft is surrounded by a torque shaft disposed coaxially thereto; the input shaft extends through the entire continuously variable transmission and is provided at its end with an axial disc. This axial disc is associated with a pressure device, which actuates a first input disc of a transmission unit in direction toward its associated output disc. The input disc of the second transmission unit supports itself, via an axial bearing on a second axial disc, and via a radial bearing on the input shaft.

Between the two transmission units is provided a cup-shaped bearing bracket element in which is located a gear wheel actuated by the two output discs of the two transmission units and meshing with an output gear wheel off an output shaft. The bearing bracket element forms, together with an upper and lower chassis bar, a supporting frame wherein the chassis bars support upper and lower cross yokes in which are mounted the supports for the toroidal wheels which can roll off on preselected, inclined planes in order thus to transmit in continuously variable ratio, the torque from the respective appertaining input disc to the appertaining output disc of the transmission unit.

SUMMARY OF THE INVENTION

The problem to be solved by the invention is to more compactly construct the variator and therewith the transmission and to increase the rigidity of the wheel supports and thus increase the stability of the variator.

The advantages attainable by the invention consist, among others, is that a more compact design is obtained as result of lower supports and, that the supports can be more rigidly designed, whereby displacements of contact point and less compensating movements due to warping is achieved. In addition, a tunnel compatibility is made possible, regarding a plurality of vehicles, due to the cross connection of the supports by means of the yokes, which appeared on the upper side in the former toroidal transmission, is eliminated.

The toroidal transmission, according to the invention, is advantageously designed both as a one-way and two-way toroidal transmission, the latter having two pairs of input and output discs. The transmission, according to the invention, likewise can be designed as one-way transmission with one input and one output shaft, but also as two-way transmission advantageously having one input shaft, one torque shaft disposed coaxially thereto and one output gear wheel between the two output discs.

BRIEF DESCRIPTION OF THE DRAWING(S)

The invention is explained in detail herebelow, by way of example, the drawings, in which advantageous embodiments, are shown:

DESCRIPTION OF THE PREFERRED EMBODIMENT(S)

Figure 1:
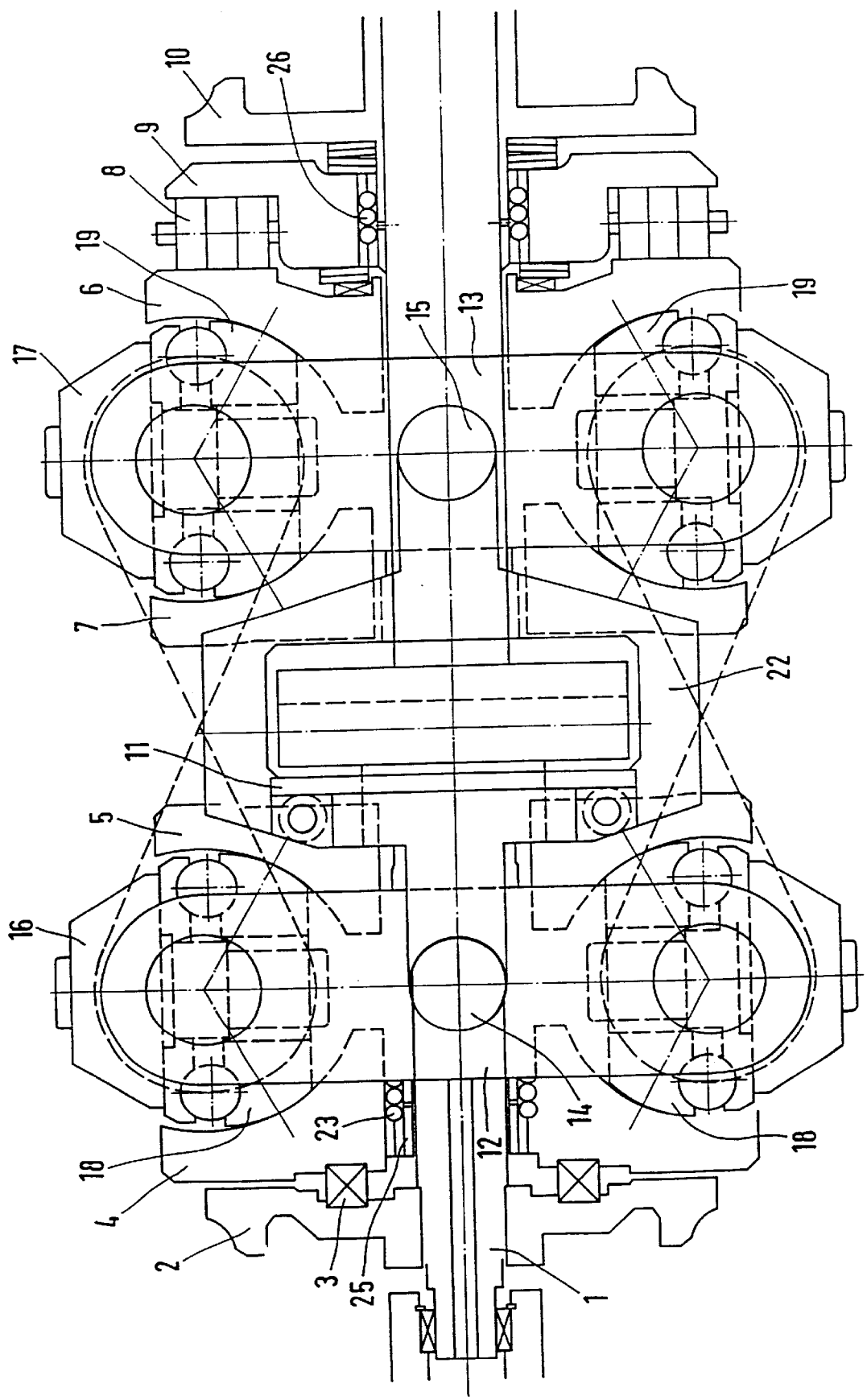
FIG. 1 is a diagrammatic longitudinal elevation on a continuously variable toroidal transmission.

In the diagrammatic longitudinal elevation of a continuously variable toroidal transmission, shown in FIG. 1, only the parts essential for understanding the invention are shown. The input shaft 1 extends through the whole transmission and supports an axial disc 2 non-rotatably connected therewith, shaft 1 is coaxially surrounded over part of its length by a torque shaft 25. The input shaft 1 is connected with a start up element (not shown) such as a torque converter or a wet operating starting clutch of a prime mover of a motor vehicle. The continuously variable toroidal transmission has two units, each of which is comprised of an input disc 4 and associated therewith an output disc 5, together defining a toroidal surface. The input disc 4 of one transmission unit supports itself, via a bearing 3 on an axial disc 2, and is non-rotatably, but longitudinally movably mounted via, a locking device (ball-spline) 23 on the torque shaft 25. The output disc 5, associated therewith, is situated on a bushing. An input disc 6 of a second transmission unit is likewise non-rotatably supported on the torque shaft 25 while and output disc 7 associated therewith is firmly connected with the bushing which the torque shaft surrounds.

A pressure device 8 is cylindrically shaped and is situated between the input disc 6 and a disc 9 having a curved path. The disc 9 is movable in an axial direction, but non-rotatably connected with the input shaft 1. By means of the cylindrical pressure device 8, the input disc 6 is urged in an axial direction relative to the output disc 7 and the input disc 4 in an axial direction relative to the output disc 5.

A chassis bar 22 is firmly connected to a cup shaped bearing bracket 11, for example, by bolting; for example, by bolting, a chassis bar 22. The bracket 11 is centrally traversed by the torque shaft 25. A bracket bearing element 11 is located between the two transmission units and separates them from each other. The bracket bearing element 11, as with the upper chassis bar 22 and another lower chassis bar, form together a supporting frame. With pivots 14, 15 are two upper cross 15 yokes 12, 13 in which are mounted supports 16, 17 for the wheels 18, 19. Not shown in FIG. 1 are the lower cross yokes in which are also placed pivots for the supports 16, 17 of the wheels 18, 19.

In each of the two transmission units are preferably provided two wheels 18, 19, which are secured to the tiltably disposed supports 16, 17, so that they can be pivoted relative to the longitudinal axle of the input shaft 1. The toroidal wheels 18, 19 are in frictional contact with the two surfaces facing them of the input discs 4, 6 and of the output discs 5, 7, the toroidal wheels of each transmission unit being symmetrically disposed relative to the axle of the input shaft 1.

When the swinging device (not shown), the toroidal wheels 18, 19 are inclined relative to the longitudinal axis of the input shaft 1, the points of contact of the periphery of the wheels 18, 19 move along the toroidal surface of both the input discs and the output discs, whereby a reduction ratio between an input and an output speed can be adjusted continuously, that is, infinitely varied.

Figure 2:
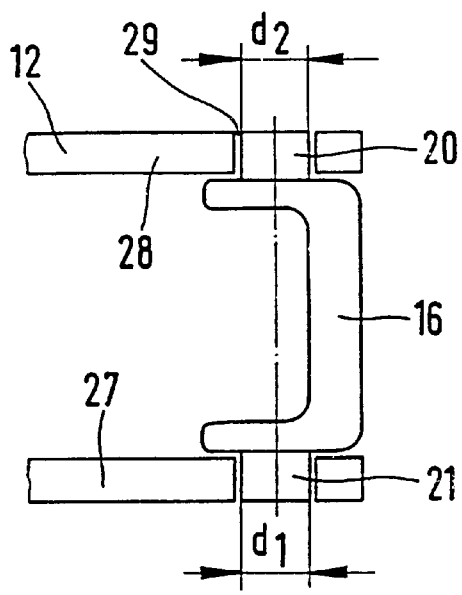
FIG. 2 is a section through a conventional support for the wheels.

FIG. 2 shows a cross section through a conventional support 16 for the toroidal wheels, which on its upper side, is provided with a bearing 20 on its lower side with a bearing 21, the upper bearing 20 being supported on one end 28 of the upper cross yoke 12, that is, it penetrates a recess 29 located therein. Upper cross yoke 12 and lower cross yoke 27 extend parallel to each other.

Figure 3:
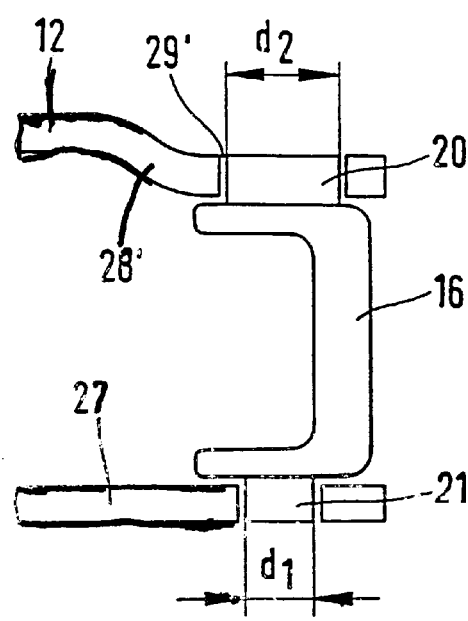
FIG. 3 is a section through a support according to the present invention.

As shown in FIG. 3 to reduce the total height, the upper ends 28' of the upper cross yokes 12, 13 are decreased in a direction toward the lower cross yokes 27 while the lower cross yokes maintain their original shape. It is also possible gradually to increase the ends of the lower cross yokes 27 in direction toward the upper cross yokes 12. Thereby it is possible to reduce the total height of the supports 16, 17. The bearings 20 of the supports 16, 17 for the wheels 18, 19 penetrate farther into the recesses 29' provided in the ends 28' of the upper cross yokes, while their diameter d2 is now larger than the diameter d1 of the lower recesses. The upper bearings 20 is of a larger diameter than the lower bearings 21.

Figure 4:
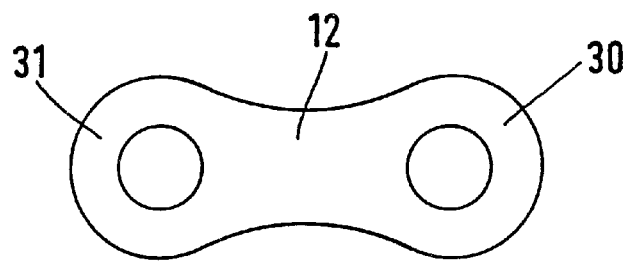
FIG. 4 is an elevation profile view of a bone shaped yoke.

In another advantageous embodiment, either one end or both ends of the upper cross yoke 12 and/or one end or both ends of the lower cross yoke 27 are respectively provided with a bone-shaped thickening 30, 31, as shown in FIG. 4 in top view upon an upper cross yoke 12. In this version, the gradual decline of the cross yokes can be eliminated.

These larger bearings on the upper side of the supports offer the advantage of an increased rigidity and therewith less displacement of the points of contact of the toroidal wheels on the input and output discs facing them and, accordingly, less compensation movement resulting from warping of the support.

Should that be the case, the supports, the lower support 12, 27 advantageously have bearings, which compared to normal supports lie closer to the axle center of the toroidal wheel, which can be accomplished only by enlarging the diameters of the bearings.

The upper and lower yokes, or the upper and lower cross yoke, are gradually lowered at the ends with equal disc spacing for implementing the larger bearing diameter, or can be bone-shaped thickened at their ends (FIG. 4). At the same time, specially on the side of the axially movable discs (that is, the input discs), the yoke must be more recesses that in the toroidal transmissions already known, since the yoke lying closer to the axle center to the toroidal outline of the disc. The yoke shape is advantageously asymmetrically recessed in the middle (more on the side of the movable disc, less on the side of the fixed disc).

What is claimed is:

1. A continuously variable toroidal transmission having:
   an input shaft (1);
   an input disc (4,6) coaxially disposed for rotation with the input shaft and having a toroidal inner surface;
   an output disc (5,7) coaxially disposed relative to the input shaft and having a toroidal inner surface, the input disc and the output disc forming one pair;
   a plurality of tiltable wheels (18,19) placed between the toroidal surfaces of the input disc and output disc for transmitting a torque from the input disc to the output disc;
   a pressure application device (8) adjacent the input disc in order to urge it in a direction toward the output disc;
   an output component for rotation with the output disc; and
   an axial member (2) supporting the output disc;
   supports (16,17) are provided for the wheels (18,19) and are mounted to the ends of lower and upper cross yokes; and wherein the ends (28') of the upper cross yokes (12,13) are shaped to reduce the spacing from the lower cross yokes (27), the supports (16,17) have upper bearings (20) and lower bearings (21) which penetrate corresponding recesses (29') in the ends (28') of the upper cross yokes (12,13) and of the lower cross yokes (27) and a diameter (d2) of the upper bearings (20) is larger than a diameter (d1) of the lower bearings (21).

2. The toroidal transmission according to claim 1, wherein the ends of the upper cross yokes are lower than a central portion of the upper cross yokes.

3. The toroidal transmission according to claim 1, wherein two input discs (4,6) and two output discs (5,7) are provided and the two output discs have mirror symmetry relative to each other and are parallel to each other, and a gear wheel is placed between the two output discs and the axial member (2) is firmly connected with the input shaft (1) and one of the input discs (4) supports itself on an axial flange (2).

4. A continuously variable toroidal transmission having:

an input shaft (1);

an input disc (4, 6) disposed for rotation with the input shaft and having a toroidal inner surface;

an output disc (5, 7) coaxially disposed relative to the input shaft and having a toroidal inner surface, the input disc and the output disc forming a pair;

a plurality of tiltable wheels (18, 19) situated between the toroidal surfaces of the pair of discs for transmitting torque from the input disc to the output disc;

a pressure device (8) adjacent the input disc to urge the input disc in the direction toward the output disc;

an output component for rotation with the output disc;

an axial flange (2) supporting the output disc, wherein supports (16, 17) for the wheels (18, 19) are mounted to the ends of lower and upper cross yokes; and wherein the supports (16,17) have upper bearings (20) and lower bearings (21) which penetrate corresponding recesses (29') in the ends (28') of the upper cross yokes (12, 13) and of the lower cross yokes (27) and a diameter (d2) of the upper bearings (20) is larger than a diameter (d1) of the lower bearings (21).

* * * * *